Feb. 11, 1930.   M. P. BOLLESEN   1,746,334
SHADE ATTACHMENT FOR AUTOMOBILES
Filed April 4, 1928   2 Sheets-Sheet 1
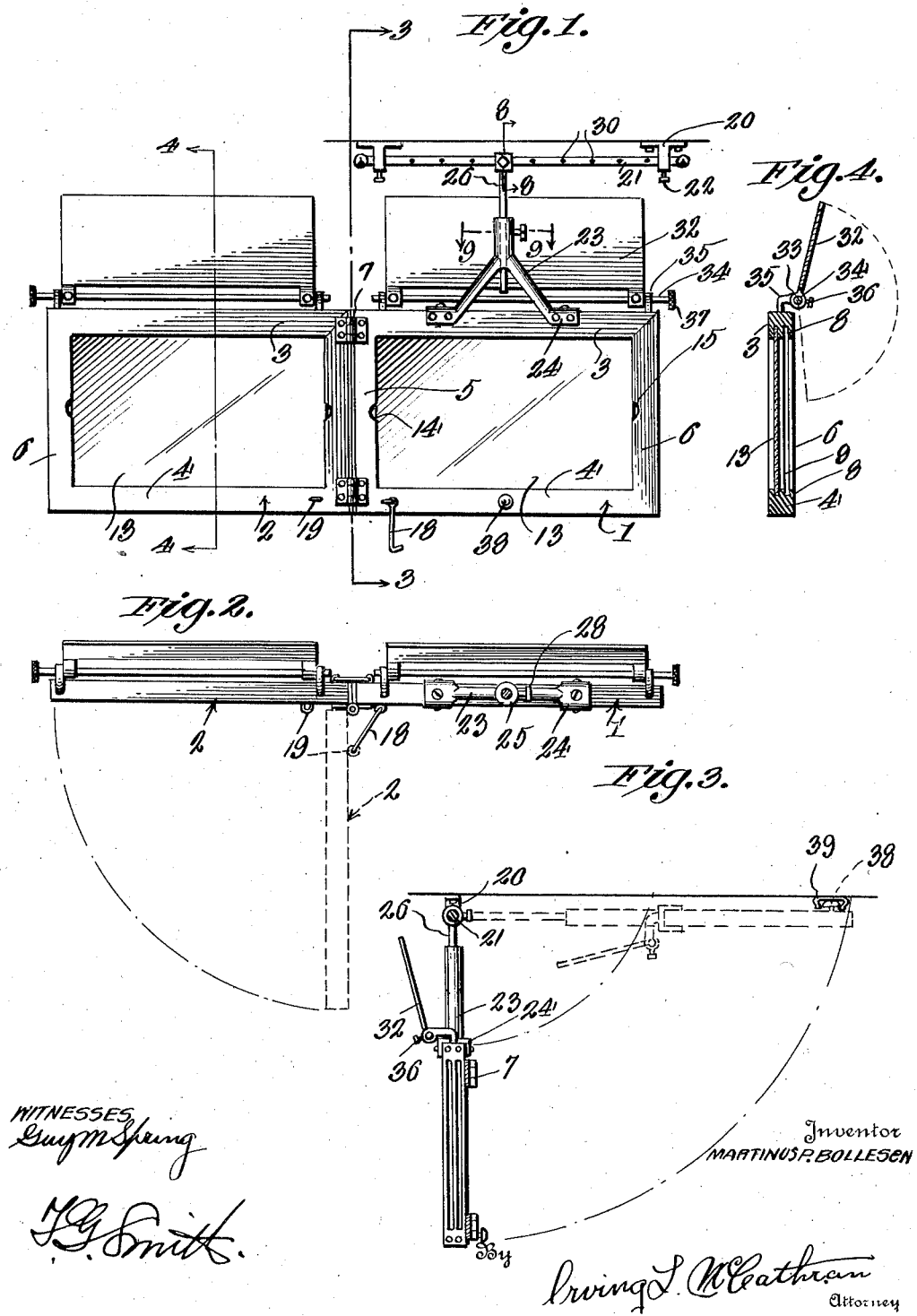
Inventor
MARTINUS P. BOLLESEN Feb. 11, 1930.                M. P. BOLLESEN                1,746,334
                    SHADE ATTACHMENT FOR AUTOMOBILES
                   Filed April 4, 1928        2 Sheets-Sheet 2
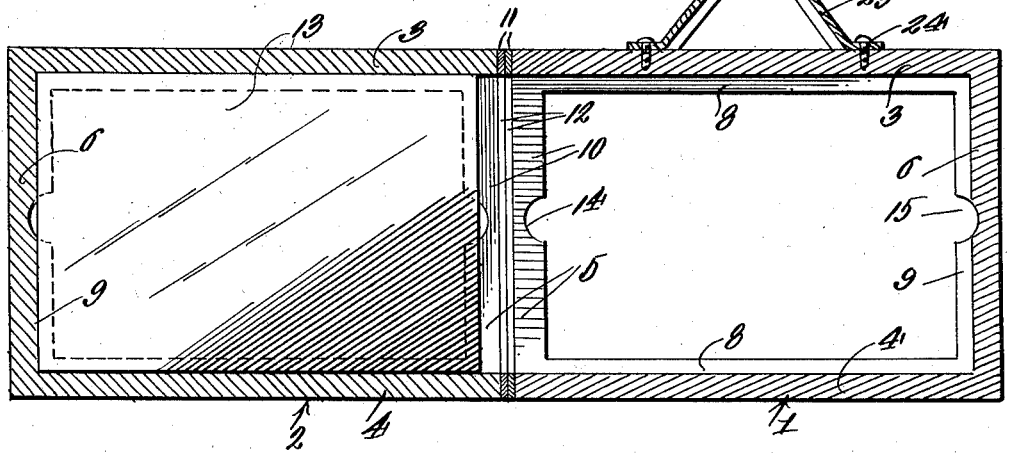
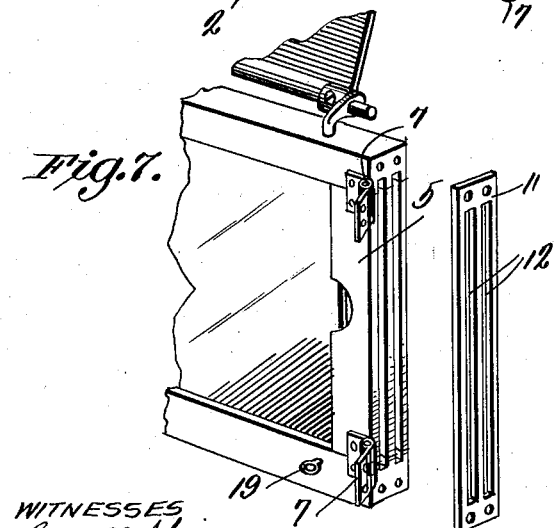
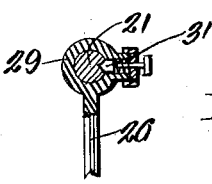
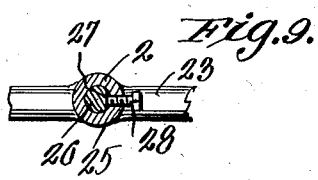
Inventor
MARTINUS P. BOLLESEN
WITNESSES
By
Attorney Patented Feb. 11, 1930

1,746,334

UNITED STATES PATENT OFFICE

MARTINUS P. BOLLESEN, OF PLAINVIEW, NEBRASKA

SHADE ATTACHMENT FOR AUTOMOBILES

Application filed April 4, 1928. Serial No. 267,344.

This invention relates to improvements in shade attachments for automobiles and has as its general object to provide an attachment which may be readily installed upon an automobile and suitably adjusted to shield the driver's eyes from the sun rays and, in driving at night, from the glare of oncoming automobiles.

Another object of the invention is to provide a shade attachment of the class described so constructed that the same may be readily adjusted to suit the driver's convenience and afford protection to his eyes whether the sun is in the direction in which the machine is travelling or to one side of the line of travel.

Another object of the invention is to provide a shade of the class described embodying light ray transmitting panes which may be of any desired color, as well as opaque shade members, so that the attachment may be adjusted and arranged for use in accordance with the intensity of the light.

Another object of the invention is to provide, in a shade attachment of the class described, a plurality of hingedly connected frames within which are mounted panes of glass, and the frames being so constructed as to permit of transference of the panes of glass from one frame to the other without any interference on the part of either pane with the other, so that a double thickness of glass may be provided in either of the frames, a single thickness in each frame, or either frame be left devoid of a light ray modifying means such as its respective pane, as for example when driving at night on dark roads and where colored panes would be a disadvantage.

Another object of the invention is to so connect the pane frames of the shade attachment that the said frames may be adjusted to occupy a common plane or planes at an angle to each other and held in their positions of adjustment, so that, in the first position of adjustment, both panes may be positioned to extend in front of the driver of the automobile and, in the latter position of adjustment, one pane may extend in front of the driver and the other at his left side.

While the accompanying drawings and the description which is to follow, constitute a disclosure of the preferred embodiment of the invention, it will be understood that various changes may be made within the scope of what is claimed.

In the accompanying drawings:

Figure 1 is a view in rear elevation of the shade attachment embodying the invention, the pane frames of the attachment being in a position of adjustment in which they occupy a common plane.

Figure 2 is a top plan view of the attachment, the frames being shown in the position illustrated in Figure 1, in full lines, and one of the frames being illustrated in another position in dotted lines.

Figure 3 is a vertical front to rear sectional view taken substantially on the line 3—3 of Figure 1 looking in the direction indicated by the arrows.

Figure 4 is a similar view on the line 4—4 of Figure 1 looking in the direction indicated by the arrows.

Figure 5 is a vertical longitudinal sectional view through the attachment.

Figure 6 is a horizontal sectional view through the frames, the frames being in a position of adjustment occupying a common vertical plane.

Figure 7 is a group perspective view of a fragmentary nature illustrating a portion of one of the frames and a part thereof disassembled.

Figure 8 is a detail vertical sectional view taken substantially on the line 8—8 of Figure 1 looking in the direction indicated by the arrows.

Figure 9 is a horizontal sectional view on the line 9—9 of Figure 1 looking in the direction indicated by the arrows.

While it is contemplated that the shade attachment, embodying the invention, may consist of any number of pane frames connected in the manner to be presently described, and arranged to suit varying conditions, the illustrated embodiment of the invention includes a pair of such frames, one being indicated in general by the numeral 1 and constituting the main frame and the other, indicated in general by the numeral 2, constituting the adjustable frame. The frames 1 and 2 are of counterpart construction and each comprises a top rail 3, a bottom rail 4 and side stiles indicated one by the numeral 5 and the other by the numeral 6, and as illustrated most clearly in Figures 1, 2 and 6 of the drawings, the stiles 5 of the two rails are swingingly connected by hinges 7 so that the frame 2 may be swung to the position shown in full lines in Figures 1, 2 and 6 of the drawings to occupy a common plane with the frame 1 and with the stiles abutting, the frame 2 being swingingly adjustable to assume a position extending rearwardly in a plane at a right angle to the frame 1 as shown in dotted lines in Figure 2.

In order that the frames may accommodate light ray modifying panes, which will presently be described, the top and bottom rails 3 and 4 of each frame are formed each with a pair of longitudinally extending grooves 8 and the stiles 6 are formed in their inner sides each with a pair of vertically longitudinally extending grooves 9, each stile 5 being formed with a pair of vertically extending parallel slots indicated by the numeral 10, the corresponding grooves 8 and 9 and slots 10 occupying common vertical planes. A reinforcing plate 11 of sheet metal is secured to the outer edge of each stile 5 and is formed with vertically extending slots 12 registering with the slots 10 in the respective stiles 5 and at this point it will be evident and particularly by reference to Figures 5 and 6 of the drawings, that when the frames 1 and 2 are adjusted to assume a position in a common vertical plane, the plates 11 will be in mutual facial engagement and the slots 12 in the two plates will be in registration, so that the two light ray modifying panes, which are indicated by the numeral 13, may be slidably fitted through the slots 10 in the stiles 5 and slidably fitted at their upper and lower margins in the grooves 8, each pane being slidably adjustable to occupy a position symmetrical with respect to one of the frames, as shown at the left in Figure 5, in which position the pane will be retained at its upper and lower margins in the grooves 8 and will be received at its laterally outward margin in the respective groove 9 and at its laterally inward margin in the respective slot 10.

At this point it will be understood that the panes 13, which are preferably of glass and of any desired color as for example blue, green, yellow, or red, may be independently slidably adjustable and shifted from one frame to the other and consequently both panes may occupy either of the frames alone or each pane may occupy a respective one of the frames and in order that sliding adjustment of the panes may be readily effected, the stiles 5 are formed in their inner edges with finger notches indicated by the numeral 14, and each stile 6 is formed in its inner edge with a finger notch 15, the notches being of such depth that when either pane is properly arranged to occupy a respective one of the frames, the vertical edges of the pane will span the respective notches, so that the driver's forefinger may be inserted into one or another of the notches and in engagement with the adjacent vertical edge of the respective pane for the purpose of exerting longitudinal pressure against the pane to effect sliding adjustment thereof.

In order that the frames 1 and 2 may be held in position occupying a common vertical plane, any means such as a hook 16 may be pivotally mounted upon the stile 5 of one frame at that side thereof opposite the side at which the hinges 7 are located, and may be engaged with a keeper eye 17 upon the corresponding face of the stile 5 of the other frame as shown in Figures 2 and 6, and in order that the frame 2 may be held in position at right angles to the frame 1 as shown in dotted lines in Figure 2, a similar hook 18 may be mounted upon one of the lower rails 4 and engaged with a keeper eye 19 upon the other lower rail 4 as clearly shown in Figure 2.

In accordance with the invention, the frame 1 of the shade attachment is to be suspended beneath the top of the automobile, in a rigid manner, and constitutes a support for the frame 2, and in order that the frame 1 may be supported in the manner stated, bearing brackets 20 are secured to the under side of the front bar of the frame of the top of the automobile and a rod 21 is fitted at its ends in these bearings and secured in place by set screws 22 so as to be held against both rotative and longitudinal displacement. A bracket 23 preferably of the inverted V-shape shown in Figure 1 of the drawings, is secured at the lower ends of its branches as at 24, to the top rail 3 of the frame 1, and this bracket is provided at the juncture of its arms with a sleeve 25 into which is threaded the lower portion of the suspension rod 26, this rod being flattened upon one side as shown in Figure 9 of the drawings and indicated by the numeral 27, so that a set screw 28, which is threaded through one side of the sleeve 25, may be tightened to bear against the flattened side of the rod and thus hold the sleeve 25 against rotative movement upon the rod 26 after the desired adjustment of the rod and sleeve has been effected, it being understood that relative rotative adjustment of either of these parts will effect a raising or lowering of the sleeve 25 and consequently a corresponding raising or lowering of the frame 1.

The rod 26 is provided at its upper end with a collar 29 which is slidably adjustably disposed upon the rod 21, and the said rod is formed at intervals in its length and preferably in its rearwardly presented side with a series of sockets 30, a spring pressed latch 31 being mounted upon the collar 29, as clearly shown in Figure 8 of the drawings, to engage in the sockets 30, selectively. In this manner means is provided for adjustment of the suspension means for the frame 1, longitudinally of the rod 21, and therefore the frame may be adjusted transversely of the front of the automobile so as to assume the desired position in front of the driver.

As previously explained, the panes 13 may be of any desired color of glass and of corresponding colors or different colors as may be desired and the primary purpose of these panes is to shield the driver's eyes from the glare of the road and, if either pane should be employed in night driving, to eliminate the glare from the headlights of an oncoming automobile. In order that the driver's eyes may be shielded from the direct rays of the sun, a plate 32 of sheet metal or other opaque material is associated with each of the frames 1 and 2 and is provided at one longitudinal edge with spaced collars 33 which are rotatably fitted onto a rod 34 mounted in suitable bearing brackets 35 upon the upper edge of the top rail 3 of the respective frame, the set screws 36 being threaded through the collars 33 and adjustable to bind against the said rod 34 so as to secure the plates to the respective rods. Preferably a finger knob 37 is provided at the outer end of each of the rods 33 or in other words at the right hand end of the rod which is mounted upon the frame 1 and upon the left hand end of the rod which is mounted upon the frame 2, so that by grasping the knobs and rotatably adjusting the rods 34, the respective plates 32 may be adjusted to assume any desired position best suited to shield the driver's eyes from the rays of the sun.

At times when the attachment is not required to be used, it is of course desirable that it be supported in a position to be entirely out of the way and with this object in view a stud member 38 is fixed upon the rear side of the lower rail 4 of the frame 1 and is engageable in a socket member 39 which may be mounted upon the under side of one of the cross bows of the top of the automobile as shown in Figure 3, so that by retracting the locking member 31 and swinging the two frames rearwardly and upwardly to the broken line position shown in Figure 3, the said stud member 38 may be engaged in the socket member 39 and the frame thus supported in position beneath and close to the top of the automobile.

Having thus described the invention, what I claim is:

1. In a shade attachment of the class described, frames connected to each other for relative angular adjustment to assume positions in a common plane and positions at an angle to each other, each of said frames including upper and lower rails having opposed grooves in their opposing sides, corresponding grooves in the rails of the two frames being designed to register when the frames are adjusted to assume a position in a common plane, means for supporting one of said frames, means for holding the frames in positions of adjustment with respect to each other, and light ray transmitting and modifying panes slidably mounted in said grooves and adjustable from one to the other of said frames.

2. In a shade attachment of the class described, frames connected to each other for relative angular adjustment to assume positions in a common plane and positions at an angle to each other, the frames each including top and bottom rails and end stiles, the relatively adjacent end stiles of the two frames having slots therein extending vertically thereof and the opposing sides of the top and bottom rails of each frame having longitudinal grooves therein registering each at one end with a respective one of the slots, means for supporting one of said frames, and light ray transmitting and modifying panes slidably adjustably mounted at their upper and lower margins in respective corresponding ones of the grooves and slidably adjustable through the slots to assume positions in one or the other of the frames.

3. In a shade attachment of the class described, frames connected to each other for relative angular adjustment to assume positions in a common plane and positions at an angle to each other, each of said frames comprising upper and lower rails and end stiles, the frames being connected end to end, the relatively adjacent stiles of the frames having pairs of vertical slots formed therein, the opposing sides of the top and bottom rails of each frame being formed with pairs of longitudinally extending grooves each communicating at one end with a respective one of said slots, the relatively remote stiles of the frames having pairs of vertically extending grooves therein, means for supporting one of said frames, and light ray transmitting and modifying panes slidably adjustably mounted in the grooves in the rails of the frames and each adjustable to assume a position with its upper and lower margins engaging in the grooves in the rails of a respective frame and its vertical margins engaging one in the groove in the outer stile of the respective frame and its other vertical margin engaging in a respective one of the slots in the inner stile of the respective frame, the said panes being slidably adjustable from one to the other of said frames in the position of adjustment of the frames in which they occupy a common plane.

4. In a shade attachment of the class described, frames connected to each other for relative angular adjustment to assume positions in a common plane and positions at an angle to each other, each of said frames comprising upper and lower rails and end stiles, the frames being connected end to end, the relatively adjacent stiles of the frames having pairs of vertical slots formed therein, the opposing sides of the top and bottom rails of each frame being formed with pairs of longitudinally extending grooves each communicating at one end with a respective one of said slots, the relatively remote stiles of the frames having pairs of vertically extending grooves therein, means for supporting one of said frames, and light ray transmitting and modifying panes slidably adjustably mounted in the grooves in the rails of the frames and each adjustable to assume a position with its upper and lower margins engaging in the grooves in the rails of a respective frame and its vertical margins engaging one in the groove in the outer stile of the respective frame and its other vertical margin engaging in a respective one of the slots in the inner stile of the respective frame, the said panes being slidably adjustable from one to the other of said frames in the position of adjustment of the frames in which they occupy a common plane, the inner sides of the stiles of the two frames having finger notches therein to provide for engagement of the vertical edges of the panes for the purpose of adjustment of the panes.

In testimony whereof I affix my signature.

MARTINUS P. BOLLESEN.